(12) United States Patent
Au et al.

(10) Patent No.: US 7,495,805 B1
(45) Date of Patent: Feb. 24, 2009

(54) ENHANCING AN IMAGE, SUCH AS AN IMAGE HAVING BI-VALUED PIXEL VALUES

(75) Inventors: Oscar Chi-Lim Au, Kowloon (HK); Ming Sun Fu, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 552 days.

(21) Appl. No.: 09/512,378

(22) Filed: Feb. 25, 2000

(51) Int. Cl.
*G06K 15/00* (2006.01)
*G06T 5/00* (2006.01)
*H04N 1/405* (2006.01)
*H04N 1/407* (2006.01)
*H04N 1/409* (2006.01)

(52) U.S. Cl. ............... 358/3.07; 358/3.06; 358/3.24

(58) Field of Classification Search ............ 358/19, 358/306–309, 534–536, 3.05–3.08, 445–448, 358/1.9, 3.01, 3.03, 3.14; 345/596; 382/237, 382/254, 270, 205
See application file for complete search history.

(56) References Cited

U.S. PATENT DOCUMENTS

| | | | | |
|---|---|---|---|---|
| 5,243,444 | A | | 9/1993 | Fan ........................ 358/456 |
| 5,268,771 | A | * | 12/1993 | Murakami et al. ......... 358/448 |
| 5,493,419 | A | * | 2/1996 | Jodoin et al. ............. 358/3.08 |
| 5,506,699 | A | * | 4/1996 | Wong ..................... 358/3.08 |
| 6,101,285 | A | * | 8/2000 | Fan ........................ 382/260 |
| 6,222,641 | B1 | * | 4/2001 | Karidi ..................... 358/1.9 |

FOREIGN PATENT DOCUMENTS

EP 0622949 A1 * 2/1994

OTHER PUBLICATIONS

Christopher M. Miceli and Kevin J. Parker, "Inverse Halftoning" Journal of Electronic Imaging, Apr. 1992, vol. 1, No. 2, pp. 143-151.*
Nguyen T. Thao, "Set Theoretic Inverse Halftoning", Proceedings of IEEE Conference on Image Processing, Oct. 1997, vol. 1, pp. 783-786.*
Ping Wah Wong, "Inverse Halftoning and Kernel Estimation for Error Diffusion", IEEE Transactions on Image Processing, Apr. 1995, vol. 4, No. 4, pp. 486-498.*
Li-Ming Chen and Hsueh-Ming Hang, "An Adaptive Inverse Halftoning Algorithm", IEEE Transactions on Image Processing, Aug. 1997, vol. 6, No. 8, pp. 1202-1209.*

* cited by examiner

*Primary Examiner*—James A Thompson
(74) *Attorney, Agent, or Firm*—Buchanan Ingersoll & Rooney PC

(57) ABSTRACT

A method is proposed for converting an image in which each pixel takes one of two binary values, into an image in which each pixel can take continuous values. The method is iterative and works in the space domain. For each pixel, a neighborhood of the image is defined containing that pixel and other pixels. In a first iteration, the method obtains a continuous value for each pixel as a weighted sum of the binary values of the pixels in its neighborhood. In further iterations, the method obtains a continuous value for each pixel as a weighted sum of the values of the pixels in its neighborhood at the previous iteration.

8 Claims, 9 Drawing Sheets

(a)

(b)

(a) Original 'Bridge' 512x512

(b) Halftoned 'Bridge'

(c) FEPF (PSNR= 25.66dB)

(d) AVE (PSNR=24.68 dB)

(e) GRADIN (PSNR=25.35dB)

(f) KAVE (PSNR=25.11dB)

Fig. 1(a)-(f)

(g) LP5 (PSNR+25.47dB)

(h) MAXH (PSNR=25.11dB)

(i) MEDIAN (PSNR=24.96dB)

(j) SIGMA (PSNR=25.06dB)

Fig. 1(g)-(j)

(a) Original 'Lena' (512x512)

(b) Halftoned 'Lena'

(c) FEPF (PSNR=31.43dB)

(d) AVE (PSNR=30.53dB)

(e) GRADIN (PSNR=30.99dB)

(f) KAVE (PSNR=31.03dB)

Fig. 2(a)-(f)

(g) LP5 (PSNR=30.30dB)

(h) MAXH (PSNR=30.67dB)

(i) MEDIAN (PSNR=30.87dB)

(j) SIGMA (PSNR=31.06dB)

Fig. 2(g)-(j)

(a) Original 'Pepper' 512x512

(b) Halftoned 'Pepper'

(c) FEPF (PSNR=30.68dB)

(d) AVE (PSNR=29.49dB)

(e) GRADIN (PSNR=29.95dB)

(f) KAVE (PSNR=30.11dB)

Fig. 3(a)-(f)

(g) LP5 (PSNR=29.22dB)   (h) MAXH (PSNR=29.51dB)

(i) MEDIAN (PSNR=29.97dB)   (j) SIGMA (PSNR=30.38dB)

ENHANCING AN IMAGE, SUCH AS AN IMAGE HAVING BI-VALUED PIXEL VALUES

FIELD OF THE INVENTION

The present invention relates to methods for enhancing an image, and especially, though not exclusively, to a method which converts an image in which the pixels each have one of two values into an image in which the pixel values are real numbers (continuous variables). This sort of process is conventionally known as "inverse half toning". The invention further relates to computer devices with perform methods according to the invention, and to computer program products storing computer program instructions for performing the methods of the invention.

BACKGROUND OF THE INVENTION

Image halftoning is a process to convert a continuous tone image into a binary or "halftone" image with only black and white dots, which resembles the original image when viewed from a distance. Inverse halftoning is the process to estimate the original image from the halftone image.

One simple method for inverse halftoning is simple low-pass filtering, but low pass filtering tends to give blurred images. Other, more sophisticated methods include set-theoretic projection-onto-convex-set (POCS) methods (see N. T. Thao, "Set Theoretic Inverse Halftoning", Proc. of IEEE Int. Conf. On Image Processing, Vol. 1, pp 783-6, October 1997), wavelet-based methods using edge information in highpass wavelet images (Z. Xiong, M. T. Orchard, K. Ramchandran, "Inverse Halftoning using Wavelets", Proc. of IEEE Int. Conf. On Image Processing, Vol. 1, pp 569-72, Sept. 1996), adaptive inverse halftoning using least mean square sliding window filter and Wiener filter postprocessing (L. M. Chen, H. M. Hang, "An adaptive Inversee Halftoning Algorithm", IEEE Trans. Of Image Processing, Vol. 6, No. 8, pp 1202-9, August 1997), a MMSE and MAP projection-based method (C. M. Miceli, K. J. Parker, "Inverse halftoning", J. of Electronic Imaging, Vol. 1, No. 2, pp 143-51, Apr. 1992.) and a three-level cascade algorithm (P. W. Wong, "Inverse halftoning and Kernel Estimation for Error Diffusion", IEEE Tran. On Image Processing, Vol. 4, No. 4, pp 486-98, April 1995).

These methods can usually give acceptable visual quality of estimated images (for example, they can produce an image with continuous pixel values which does not suffer excessive blurring), but they are computationally expensive.

U.S. Pat. No. 5,243,444 proposes a computationally simpler "Sigma" algorithm. In each iteration a value of a parameter sigma is defined, as is a neighborhood of each pixel. The value of the image at each given pixel is then reset as an average (that is a simple sum, not a weighted sum) of the image values of those pixels in the neighborhood of the given pixel which have a value within sigma of the value at the given pixel. In successive iterations the neighborhoods become larger and the value of sigma becomes smaller.

SUMMARY OF THE INVENTION

An object of the invention is to present new and useful methods and devices for performing image enhancement.

A further object of the invention is to present a method for inverse halftoning (among other applications) which gives acceptable visual results at an acceptable computational cost.

In general terms the invention proposes that the continuous value for any given pixel is chosen taking into account the halftone value of each of a set of pixels near the given pixel. For each of these nearby pixels, a coefficient ("significance coefficient") is defined indicating the likelihood that that nearby pixel is correlated with the given pixel (for example, the significance coefficient is low if there is a high likelihood that the nearby pixel is part of an image of a different object from the given pixel). A continuous value for the given pixel is sum of the halftone values of its nearby pixels (or of other values derived from those halftone values by a preprocessing step) weighted by the significance coefficients.

It has been found that this procedure provides inverse halftoning with an accuracy approaching that of the best known methods, but with a far smaller computational cost.

The significance values of each neighboring pixel may be derived in a relatively low number of computing steps. One possibility is for the algorithm to employ a "baseline value" for the given pixel (that is, an estimate of the value of the given pixel), and to set the significance value of each nearby pixel to a high value when the halftone value (or its preprocessed analogue) of the nearby pixel is similar to the baseline value, and a low value otherwise.

Specifically, the significance coefficient of any nearby pixel may be set as a decreasing (e.g. decreasing, continuous, non-linear) function of the difference between the halftone value for that nearby pixel and the baseline value.

The baseline value of a given pixel is preferably selected to be a low pass value of the halftone value (or its preprocessed analogue) for the given pixel. The reason for defining the baseline value as a low pass value of the halftone value (rather than as that halftone value itself) is that the low pass value tends to give a better estimate of the correct continuous value at the given pixel than does the original halftone value at that pixel. Thus, this gives a better estimate of the significance of neighboring pixels. Since the low pass value of the given pixel may be worked out as a linear function of the halftone values of a few of its neighbors, the significance values can be calculated by a small number of calculations each.

Thus, significant differences between the present invention in its preferred forms and the sigma algorithm include: the use of significance values; the reconstruction of images by a weighted sum (using the significance values as weights, with appropriate normalization); the use of a baseline value to derive the significance values.

The invention is normally performed iteratively. At each iteration, a significance coefficient is rederived for each pixel nearby a given pixel. This may be done using the reconstructed continuous value of the nearby pixel as found in the previous iteration, in place of the halftone value of the nearby pixel. Similarly, the baseline value used in each iteration may be rederived using the reconstructed values from the preceding iteration. Alternatively, though less preferably, any of the iterations may employ not only values from the immediately preceding iteration but any other preceding iteration(s).

Successive iterations produce successive reconstructed images which (it is hoped) will successively resemble more closely the original image. Thus, the reconstructed image at each iteration can be used to produce successively better estimates of the likelihood that the values of any two pixels in the original image are correlated. For this reason, at each iteration the significance coefficients (which may be thought of as an estimate of the likelihood that the value of the neighborhood pixel of the original image is correlated with the value of the individual pixel of the original image) are preferably re-derived, based on the reconstructed image from the last iteration (or less preferably from other of the previous iterations). The significance coefficients can thus also be considered as an indication of the likelihood that the value of a neighborhood pixel in the image obtained during that previous iterations is correlated with the value of the individual pixel in the original image.

The present inventors have found that the basic algorithm may be improved, within the scope of the present invention, by combining it with any one or more of the following optional steps.

Firstly, as mentioned, a preprocessing may be carried out (e.g. according to a known filter algorithm, such as a low pass filter) to produce a set of initial values to which the algorithm described above is applied.

A second option, is to enhance the reconstructed continuous image produced by the method, by combining it with an inverse half-toned image produced by another filtering algorithm.

A third option is to vary the method of the invention on different iterations. For example, if the invention calculates significance values of a nearby pixel as a function of the difference between a baseline value of a given pixel and a value of that nearby pixel (such as the reconstructed value obtained at the previous iteration), the method may be varied by varying the function used on different iterations. For example, if the function is defined in terms of a parameter, that parameter may be different at different iterations. Alternatively, or additionally, the definition of what constitutes a "nearby pixel" may vary from one iteration to another.

Of course, real values in digital computers are in principle never strictly continuous, but only defined to a limited precision. As used in this document the term "continuous value" of an image pixel is used to mean a value which is not binary, but is rather selected from one of a number of predetermined possibilities greater (preferably much greater) than 2, such as one of 256 possibilities (0 to 255). By contrast, the binary values referred to may be values which can only ever be 0 or 255.

Although the invention has been explained above in relation to inverse-halftoning, the present method is applicable also to other methods of enhancing an image. Halftoning is, after all, only one or a large number of processes in which an original image is modified with the loss of information; other such processes include transmission of the original image with the introduction of noise. For any such process, the present invention can be used to attempt to reconstruct the original image using the modified version.

Furthermore, the present invention is not even limited to methods of reconstructing an original image from a corrupted version. That is, the present invention can be used as part of a process for modifying an original image. For example, the present method can be used in a process in which the pixel array is modified, such as a process in which an original image having a first array of pixels is modified (stretched or squeezed) to produce an image which has a second array of pixels with more or fewer pixels along each side of the array, or even in which the second array is rotated relative to the first one. In this case, for example an original image having a first array can be preprocessed to produce a preprocessed image having a modified array, and the method of the invention can be used to enhance the preprocessed image.

The present invention has been presented in terms of a method, but the invention also includes computer apparatus arranged to perform any of the methods, as well as a computer program product, such as a recording medium, carrying computer program instructions and readable by a computer to cause the computer to carry out any of the methods according to the invention.

BRIEF DESCRIPTION OF THE DRAWINGS

Embodiments of the invention will now be described for the sake of example only with reference to the following figures, in which:

FIG. 1(a)-(j) shows an original image "bridge", a halftoned version, and eight reconstructions;

FIG. 2(a)-(j) shows an original image "lena", a halftoned version, and eight reconstructions;

FIG. 3(a)-(j) shows an original image "pepper", a halftoned version, and eight reconstructions;

FIG. 4(a)-(c) shows three possible definitions of a neighborhood, for use in the invention;

FIG. 6(a)-(l) shows, at each of two resolutions, a 512×512 image "lena", a halftone version, and four reconstructions.

DETAILED DESCRIPTION OF EMBODIMENTS

1. Description of the General Algorithm

The original image is an array in which the pixels are labelled by indices i and j. Let the original image (i.e. the image from which the halftoned image was produced) be z(i,j). In real engineering applications, z is unknown. For simplicity in the detailed examples given below we used an original image z which is a grey-tone black-and-white image, however the present invention is also applicable to colour images, having 3 components (e.g. R, G, B with an array for each component). In this case, for example, the methods of the present invention may, for example, be applied to a z which is the luminance level.

The (known) halftone image of z is called x, having pixel values x(i,j), which for any i or j takes one of two values, e.g. equal to 0 or 255. The halftoning operation may be written as x=H(z).

The proposed method operates in the space domain. It is iterative, being in M steps labelled by integer index m. After each m-th iteration, the method proposes as a reconstruction of z, an inverse halftoned image $y^m$ which has a value at the pixel (i,j) of $y^m(i,j)$. The original halftone image x(i,j) is also referred to here as $y^0(i,j)$ for all i and j.

On the (m+1)-th iteration, the value of $y^{m+1}(i,j)$ is determined by the values of $y^m$ at a set of pixels surrounding, and normally including, the pixel (i,j). This set of "neighborhood" pixels may vary for different m, and is here referred to as $N^{m+1}(i,j)$. We will employ a set of indices (k,l) to label this set: the pixels of $N^{m+1}(i,j)$ are here called (i+k, j+l) for certain values of k and l. For example, a 3×3 grid with the pixel (i,j) at the centre is obtained if the k and l each take independently take the values −1, 0 and +1. More generally, we will here write the values of k and l such that (i+k, j+l) is in $N^{m+1}(i,j)$ as $(k,l) \in N^{m+1}(i,j)$. Various ways of selecting set $N^{m+1}(i,j)$ will be discussed below.

For each m greater than 0, $y^m$ for all i and j is obtained from the function:

$$y^{m+1}(i,j) = \Sigma_{(k,l) \in N{m+1}(i,j)} a_{ij}^{m+1}(k,l) y^m(i+k,j+l), m=0, 1, 2, \ldots, (M-1),$$

where $a_{ij}^{m+1}(k,l)$ are spatially varying coefficients in the (m+1)-th iteration. This is effectively a spatially varying linear filter.

The present invention proposes that the $a_{ij}^{m+1}(k,l)$ are set to reflect the likelihood that the value of $y^m$ at the point (i+k, j+l)

gives valuable information about the value of z(i,j). In other words, $a_{ij}^{m+1}(k,l)$ should be generally high if this likelihood is high.

For example, if the image z is a photograph containing images of a number of objects, then two proximate pixels which show parts of the same object will tend to have the same value of z. So the value of x at one pixel will tend to give useful information about the value z at the other pixel. By contrast, if the two pixels are of different objects, the value of z for the two pixels may be uncorrelated, so the value of x at each of them gives little information about the value of z at the other.

At each iteration, the best estimate of the value of z(i,j) is provided by $y^m(i,j)$, so it makes sense to use this function to determine appropriate values of $a_{ij}^{m+1}(k,l)$.

The present method defines a "baseline value" $w^m(i,j)$ for $m=0, 1, \ldots, M$. This may be $y^m$ itself, but more preferably it is a function of $y^n(i,j)$ for any n less than or equal to m, in which the high frequency components are reduced, e.g. $y^m$ subjected to a low pass filter, such as an average over the pixels neighboring (i,j). This low pass feature is especially worthwhile for m small, especially m=0.

The difference between $y^m(i+k, j+l)$ and $w^m$ is a measure of the likelihood that pixel value at (i+k,j+l) is uncorrelated with the pixel value at (i,j).

The $a_{ij}^{m+1}(k,l)$ may be set as:

$$a_{ij}^{m+1}(k,l) = f^{m+1}(y^m(i+k,j+l) - w^m(i,j))$$

where f is a mapping function which is usually symmetric such that f(v)=f(−v) for all values v, so that $a_{ij}^{m+1}(k,l)$ may rewritten as:

$$a_{ij}^{m+1}(k,l) = f^{m+1}(|y^m(i+k,j+l) - w^m(i,j)|)$$

For any m, $f^{m+1}(v)$ should be a high value for v small, and a low value for v large.

For example, for m=0 $y^m$ is just x. The value of $|x(i+k,j+l) - w^0(i,j)|$ will tend to be high when the object in the image at pixel (i+k,j+l) is a different one from the object at pixel (i,j), so that the value of x(i+k,j+l) is of little use in estimating the value of z at pixel (i,j). Thus the value of a should be low.

2. Quantitative Comparison of Filtering Algorithms

The following results compare the algorithm of the present invention described above with filters which are known for the enhancement of images subject to random noise (though not in general for inverse halftoning).

Specifically, we have tested the inverse halftoning effectiveness of the present invention in comparison to 6 conventional filters: SIGMA, AVE, KAVE, GRADIN, MAXH, MEDIAN. These are defined as follows:

1. unweighted neighbor average (AVE): the filter output is simply the average within a 3×3 window. This is a spatial invariant linear filter.
2. K-nearest neighbor averaging (KAVE): the filter output is simply the average of the center pixel and 6 of the 8 neighboring pixels within a 3×3 window. The 6 pixels are those closest to the center pixel in terms of intensity. This is a spatial variant linear filter. We found 2 iterations to be good for this algorithm.
3. Gradient Inverse Weighted Smoothing (GRADIN): the weights in the 3×3 filter are the normalized gradient inverse between the center point and its neighbors. This is a spatial variant linear filter. We found 2 iterations to be good for GRADIN. This is a special case of FEPF.
4. Maximum homogeneity smooth (MAXH): this is the simple average of one of five overlapping 3×3 neighborhoods. The chosen neighborhood is one with maximum homogeneity (or minimum gradient). This is a spatial variant linear filter. We found that 1 iteration to be good for MAXH.
5. Median filtering (MEDIAN): this is the median of every 3×3 window. This is a spatial variant non-linear filter. We found that 1 iteration is good for MEDIAN.
6. SIGMA: this is similar to KAVE. Within a 3×3 window, any pixels that are within a sigma (or a certain distance) from the center pixel are chosen to form an average. This is a spatial variant linear filter.

Figure 1A:
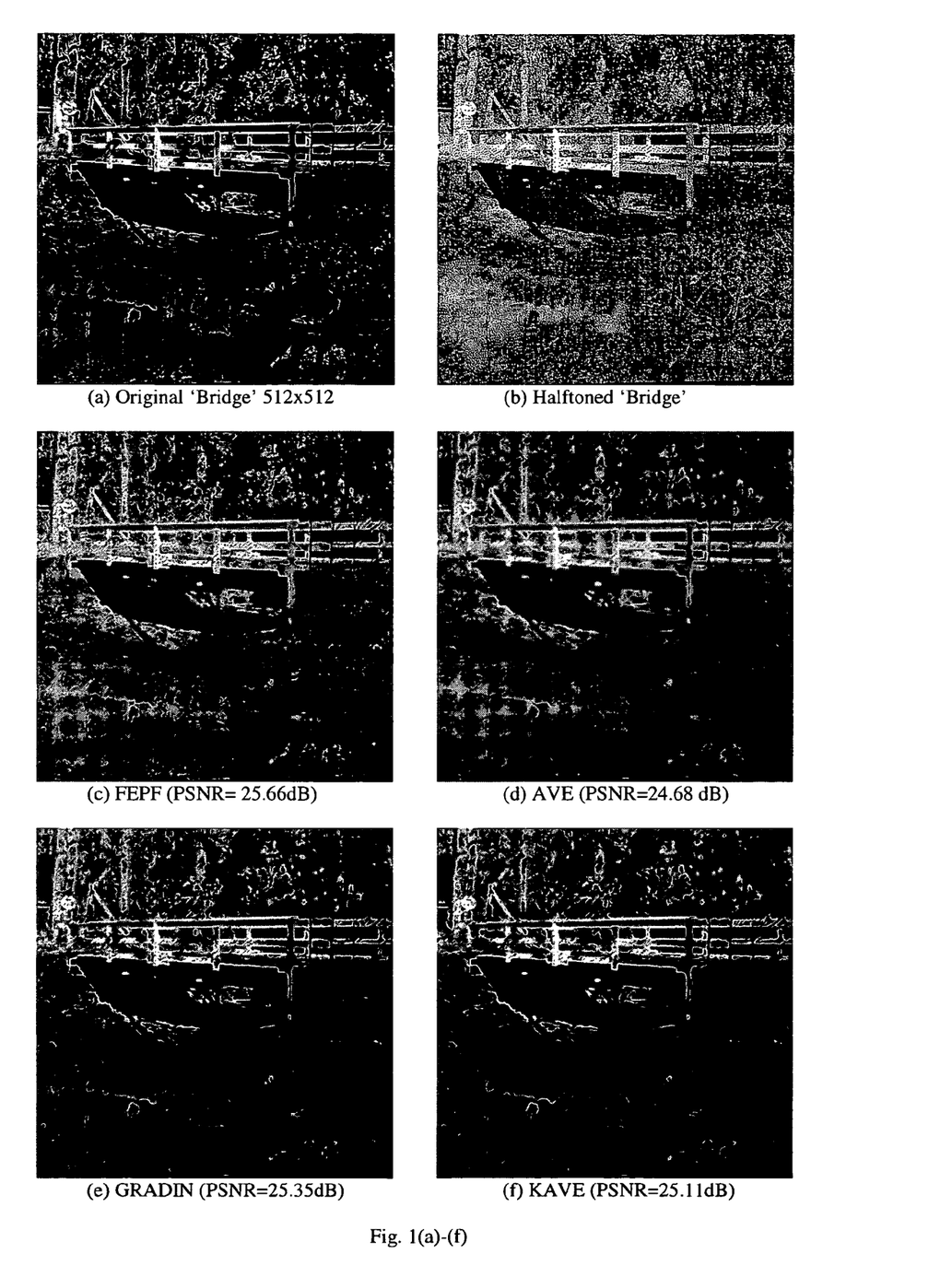
Figure 1G:
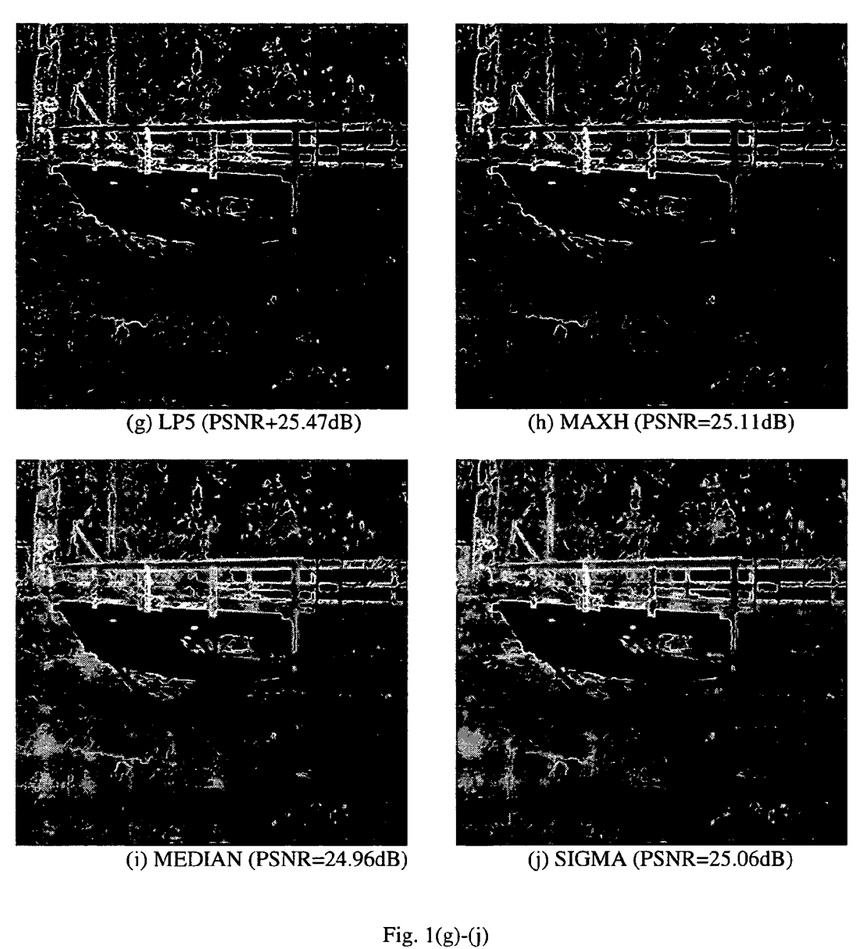
Figure 2A:
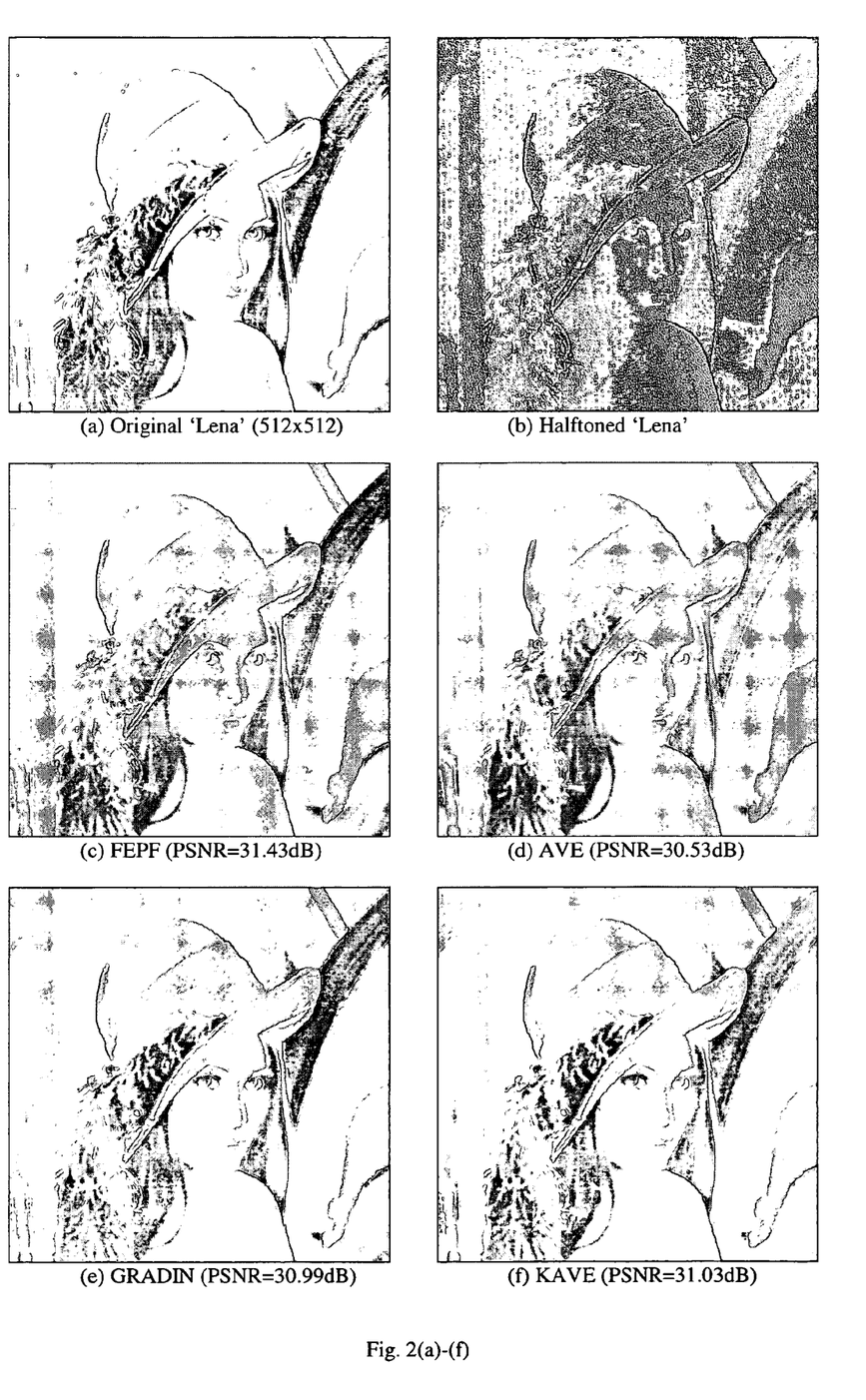
Figure 2G:
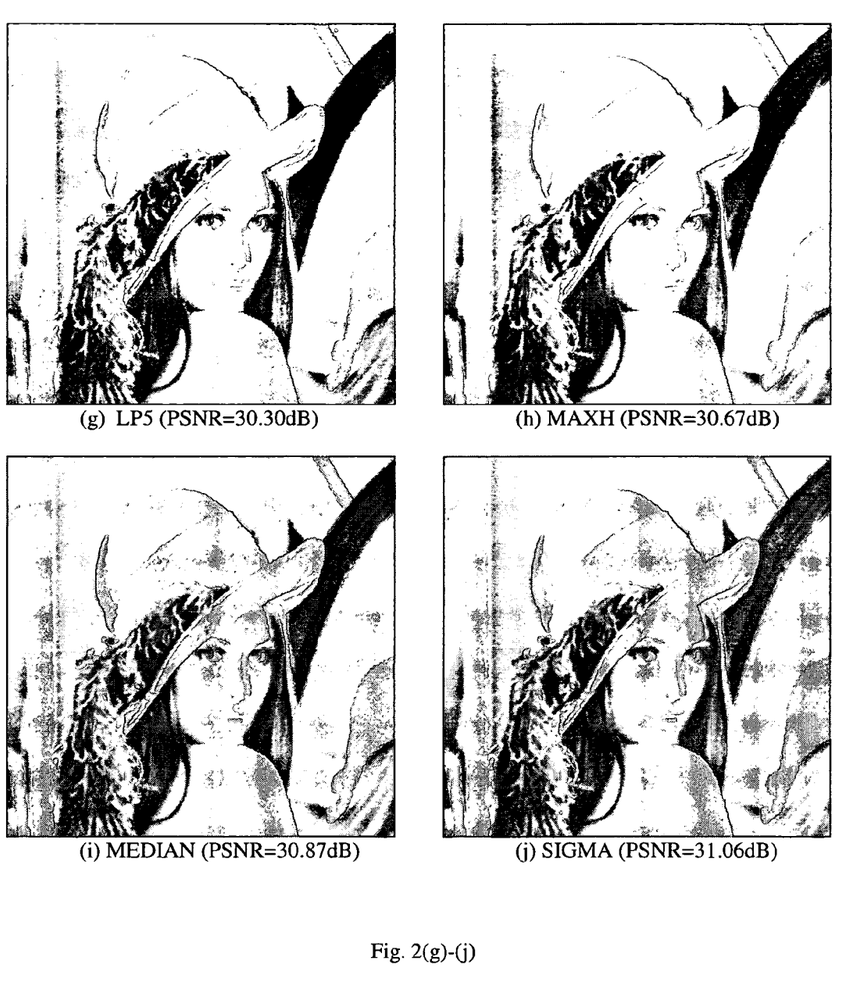
Figure 3A:
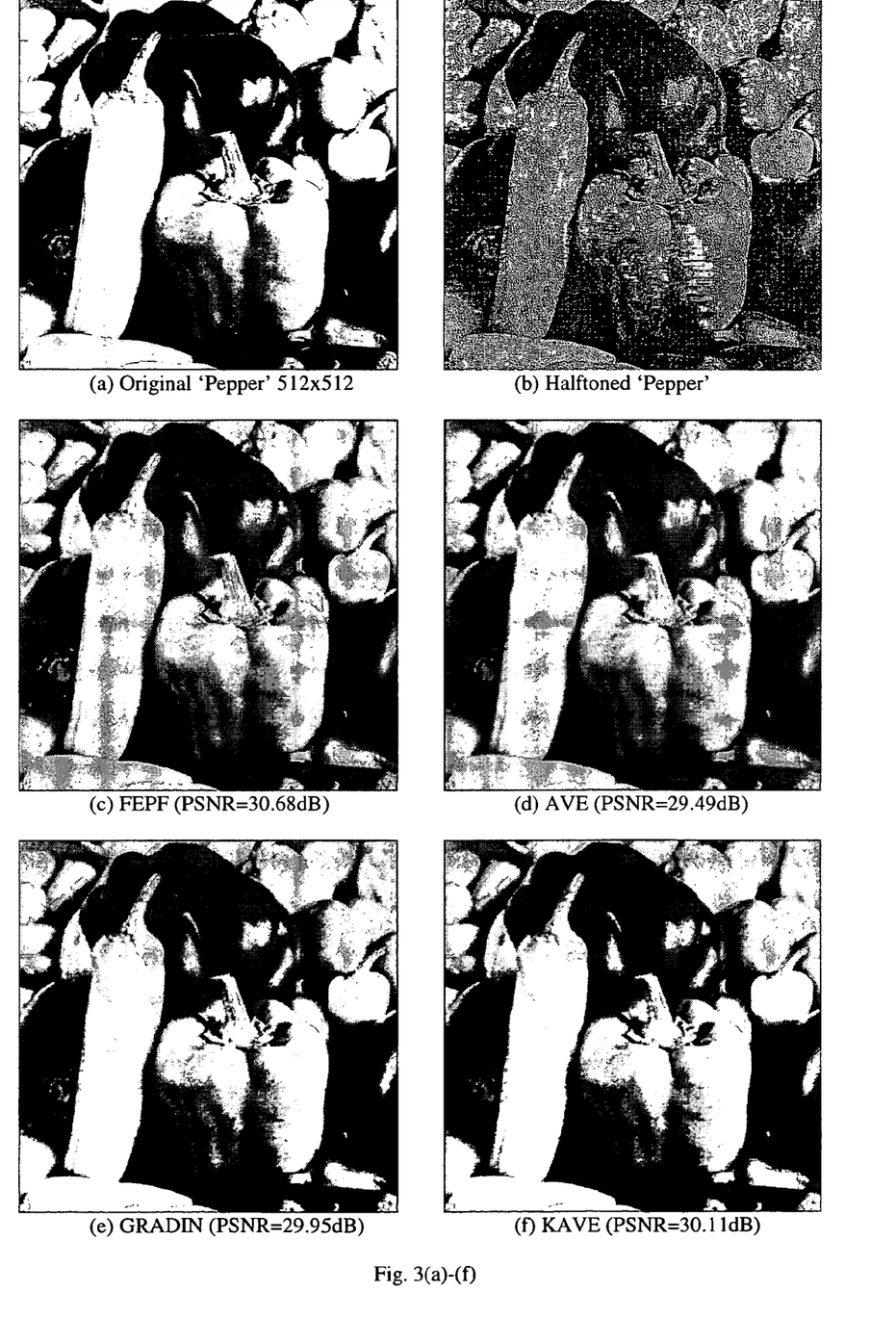
Figure 3G:
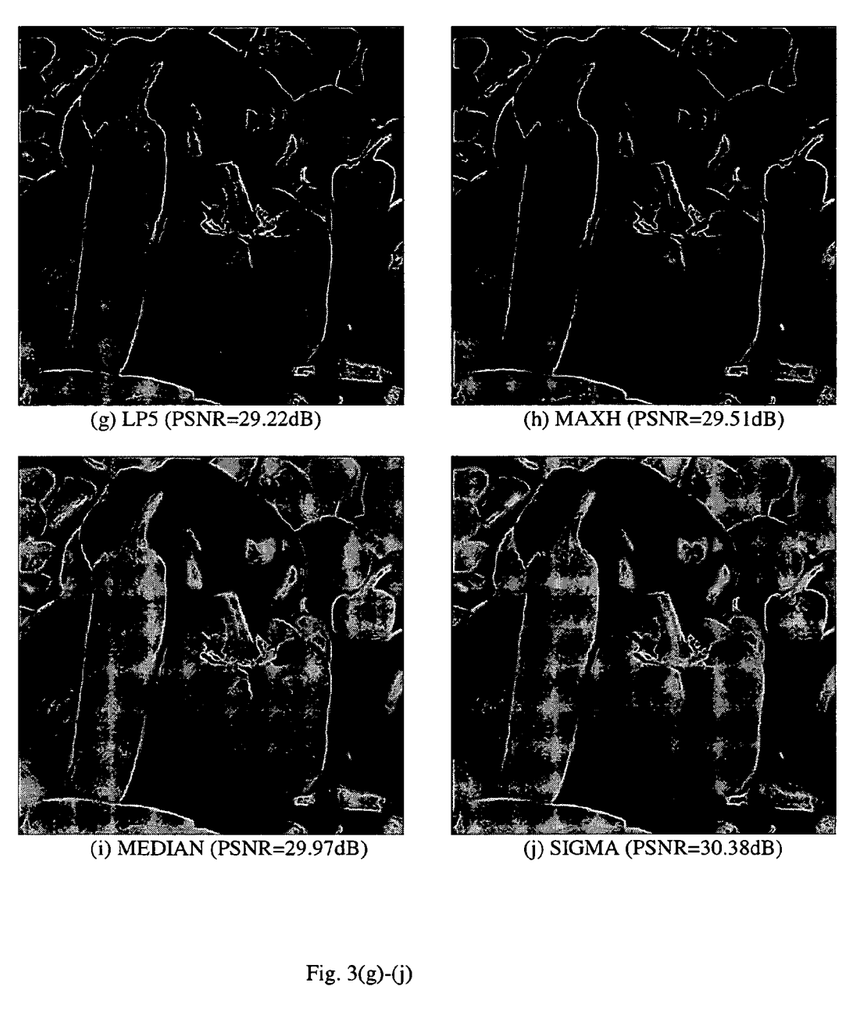

The quantitative comparison was performed using the methodology proposed in the paper "Quantitative Evaluation of some edge-preserving noise-smoothing techniques", by R. T. Chin and Chia-Lung Yeh, Computer Vision, Graphics and Image Processing, Vol. 23, 67-91 (19993). Specifically, the image is partitioned into K=2 regions and the PSNR (peak signal-to-noise-ration) of each region is measured (that is using a knowledge of the original image z). This results in values referred to as the PSNR-flat and PSNR-edge. PSNR-flat measures the PSNR in a flat region while PSNR-edge measures the PSNR in an edge region. The overall PSNR is also obtained. For any PSNR, a larger value implies lower distortion, or better performance. Three 512×512 test images are used, namely 'Lena', 'Pepper', and 'Bridge'. 'Lena' is a head-and-shoulder picture with a combination of flat regions (such as the shoulder and the face) and texture regions (such as the hair). 'Pepper' is a picture of several peppers which contains mainly flat regions. 'Bridge' is a scenery picture containing a bridge over a river, containing a mixture of flat regions and texture regions. These images are shown in FIGS. 1(a), 2(a) and 3(a). Halftone version of these images are shown in FIGS. 1(b), 2(b) and 3(b). The remaining parts of FIGS. 1, 2 and 3 show reconstructions of the original image from the halftoned version, using the seven algorithms and (in FIGS. 1(g), 2(g) and 3(g)) a lowpass filter (specifically the LP5 algorithm defined below). The PSNR results using 'Lena', 'Pepper' and 'Bridge' are shown in Tables 2, 3 and 4. The complexity of the algorithms are shown in Table 1.

The algorithm of the present invention is referred to in FIGS. 1 to 3 and in these tables as FEPF. It uses $f(i) = (1 - i/255)^k$, for k=12 or k=14.

It should be noted that it is possible to express each of the three algorithms AVE, GRADIN and SIGMA according to the terminology of the present invention, neglecting the baseline function. In this terminology, the present method can be varied to produce AVE if f(v) is redefined as f(v)=1, i.e. there is no weighting. The present case corresponds to GRADIN if f(v)=1/v; incidentally, it is not previously known to use GRADIN for inverse halftoning. The present method can be varied to produce SIGMA if the continuous function f(v) of the present method is replaced by a discontinuous function f(v) =1 for v less than a threshold (sigma) and 0 for v greater than a threshold (which also means that there is no weighting, just a simple average).

A halftone image contains only two possible pixel values: 0 and 255. Thus the filters cannot be applied to a halftone image directly. Instead, the halftone images are first lowpass filtered using a 5×5 lowpass filter. For efficient implementation, the simple filter based on the 2×2 matrix ¼ (1, 1, 1, 1) is applied four times recursively. We refer to the output of this lowpass operation as LP5.

In Tables 2 to 4, the proposed FEPF is found to achieve the highest PSNR-edge and overall PSNR suggesting that FEPF is indeed effective in preserving edges and achieve best overall image quality. Although the PSNR-flat of FEPF is not the highest, it is never much lower than the highest PSNR-flat achieved. In 'Lena', the PSNR-flat is only 0.03 dB away from the highest PSNR-flat, 33.71 dB, achieved by SIGMA. In 'Pepper', it is 0.34 dB lower than the highest PSNR-flat, 33.41 dB, achieved by SIGMA. In Bridge, it is 0.13 dB lower than the highest PSNR-flat, 28.27 dB, achieved by GRADIN.

Among the other algorithms, AVE gives rather good PSNR-flat but significantly poorer PSNR-edge and poor overall PSNR as expected. KAVE is rather effective in flat areas, but less effective in edge areas. Its PSNR-flat and PSNR-edge are always lower than FEPF. The GRADIN is not very effective in both flat and edge regions, though it performs very well in the flat regions in 'Bridge'. MAXH is bad/very bad in the flat and edge regions. Its PSNR-edge is 1.74 dB lower than FEPF. MEDIAN is rather good in the flat regions, but not as effective as FEPF in edge regions. SIGMA is effective in flat regions, achieving higher PSNR-flat than FEPF in 'Bridge', but significantly less effective in edge regions. LP5, the starting point of all algorithms, is sometimes good and sometimes bad in flat and edge regions. Its PSNR-flat is low in 'Lena', though its PSNR-edge is quite high.

It is interesting to note that, in 'Lena', all algorithms except FEPF have higher PSNR-flat but lower PSNR-edge than LP5. Actually, FEPF is the only algorithm that achieves higher PSNR-edge than LP5. Similar situations occur in 'Pepper'. LP5 has lower PSNR-flat and high PSNR-edge. All algorithms except FEPF and SIGMA achieve higher PSNR-flat but lower PSNR-edge. An exception happens in 'Bridge', in which LP5 has both high PSNR-flat and PSNR-edge. FEPF is the only one that achieves both higher PSNR-flat and PSNR-edge than LP5. Most algorithms achieve lower PSNR-flat and PSNR-edge than LP5. Compared with LP5, FEPF has similar PSNR-flat but significantly higher PSNR-edge. This implies that FEPF can yield sharper edges which are visually very important.

All these simulation results verify that the proposed FEPF is indeed effective in restoring halftone images, both in flat and edge regions. It is particularly effective in preserving edges, outperforming the algorithms tested.

In terms of complexity, FEPF is not the simplest among the algorithms. It is found that GRADIN has the same complexity as FEPF because GRADIN is a particular implementation of FEPF using less efficient mapping functions. Among all algorithms tested, LP5 is the simplest with only 4 multiplication and 12 addition per pixel. Most algorithms require 4 to 6 multiplication and 20 to 104 additions. FEPF needs 22 multiplication and 44 addition. The multiplication of FEPF is more than most but the addition is somewhat similar. These suggest that the performance superiority of FEPF is gained at the expense of slightly higher complexity.

Overall, AVE is much simpler in complexity but significantly worse in PSNR-edge with blurred edges. KAVE is similar in complexity as FEPF but significantly worse in PSNR-edge. GRADIN has the same complexity, but is worse in performance, especially in PSNR-edge. MAXH has similar complexity as FEPF but significantly worse PSNR-edge and PSNR-flat. MEDIAN is slightly simpler in complexity than PEFT but significantly worse in PSNR-edge. LP5 is much simpler in complexity than FEPF but significantly worse in PSNR-edge.

As a conclusion, the proposed FEPF outperform the tested algorithms, particularly at the edge regions yielding visually pleasing, sharp edges. Its complexity is reasonable, being slightly higher than some algorithms.

TABLE 1

Complexity of various algorithms

| Bridge 512 | Iteration | Multiplication | Addition | Memory |
|---|---|---|---|---|
| AVE (3 × 3) | 1 + LP5 | 5 | 20 | 2N |
| KAVE | 2 + LP5 | 6 | 96 | 2N |
| GRADIN | 2 + LP5 | 22 | 44 | 512 + 2N |
| MAXH | 1 + LP5 | 5 | 104 | 40 + 2N |
| MEDIAN | 1 + LP5 | 4 | 48 | 9 + 2N |
| FEPF | 2 + LP5 | 22 | 44 | 512 + 3N |
| LP5 | LP5 | 4 | 12 | 2N |
| SIGMA | 1 + LP5 | 5 | 42 | 2N |

TABLE 2

PSNR of inverse halftoned 'Lena' (512 × 512) using various algorithms

| Lena | PSNR (flat) dB | | PSNR (edge) dB | | PSNR dB | |
|---|---|---|---|---|---|---|
| AVE (3 × 3) | 33.63 | 0.05 | 25.52 | 1.56 | 30.53 | 0.90 |
| KAVE | 33.45 | 0.23 | 26.47 | 0.61 | 31.03 | 0.40 |
| GRADIN | 33.23 | 0.46 | 26.61 | 0.47 | 30.99 | 0.44 |
| MAXH | 33.06 | 0.62 | 26.14 | 0.94 | 30.67 | 0.76 |
| MEDIAN | 33.39 | 0.30 | 26.26 | 0.82 | 30.87 | 0.56 |
| FEPF | 33.68 | 0.00 | 27.08 | 0.00 | 31.43 | 0.00 |
| LP5 | 31.83 | 1.85 | 26.75 | 0.33 | 30.30 | 1.13 |
| SIGMA | 33.71 | −0.03 | 26.36 | 0.72 | 31.06 | 0.37 |

TABLE 3

PSNR of inverse halftoned 'Pepper' using various algorithms

| Pepper | PSNR (flat) | | PSNR (edge) | | PSNR | |
|---|---|---|---|---|---|---|
| AVE (3 × 3) | 33.28 | −0.21 | 23.36 | 2.20 | 29.49 | 1.19 |
| KAVE | 33.03 | 0.04 | 24.55 | 1.01 | 30.11 | 0.57 |
| GRADIN | 32.61 | 0.45 | 24.58 | 0.98 | 29.95 | 0.73 |
| MAXH | 32.58 | 0.48 | 23.83 | 1.74 | 29.51 | 1.17 |
| MEDIAN | 32.98 | 0.09 | 24.34 | 1.23 | 29.97 | 0.71 |
| FEPF | 33.06 | 0.00 | 25.56 | 0.00 | 30.68 | 0.00 |
| LP5 | 31.11 | 1.96 | 24.63 | 0.93 | 29.22 | 1.46 |
| SIGMA | 33.41 | −0.34 | 24.75 | 0.82 | 30.38 | 0.29 |

TABLE 4

PSNR of inverse halftoned 'Bridge' (512 × 512) using various algorithms.

| Bridge | PSNR (flat) | | PSNR (edge) | | PSNR | |
|---|---|---|---|---|---|---|
| AVE (3 × 3) | 27.88 | 0.26 | 23.03 | 1.22 | 24.68 | 0.98 |
| KAVE | 28.08 | 0.06 | 23.53 | 0.71 | 25.11 | 0.55 |
| GRADIN | 28.27 | −0.13 | 23.78 | 0.46 | 25.35 | 0.31 |
| MAXH | 28.08 | 0.06 | 23.52 | 0.72 | 25.11 | 0.55 |
| MEDIAN | 27.99 | 0.14 | 23.36 | 0.89 | 24.96 | 0.70 |
| FEPF | 28.14 | 0.00 | 24.24 | 0.00 | 25.66 | 0.00 |
| LP5 | 28.13 | 0.01 | 23.99 | 0.25 | 25.47 | 0.19 |
| SIGMA | 28.00 | 0.13 | 23.49 | 0.75 | 25.06 | 0.60 |

3. Comparison of Different Functions f(v)

There are numerous possible definitions for f(v). For example, (i) a polynomial function, $f(i)=(1-i/255)^k$, with k in the range 1 to 20. For k=1 this reduces to a linear map.

(ii) an exponential map: $f_{exp,k}(i)=e^{-b(k)i}$, for i=0, ..., 255 and b(k) a predefined constant.

(iii) an exponential map with shift: $f_{exp,k,j}=(0.2j-0.1)+e^{-b(k)i}$, where j ranges from 1 to 5.

(iv) a piecewise linear map, $f_{pl,i1,i2}$ which is 1 for i less than or equal to i1, 0 for i greater than i2, and (i2−i)/(i2−i1) for values in between.

Furthermore, we can divide the pixels around (i,j) into various different neighborhoods, the pixels in each neighborhood being roughly equidistant from (i,j). We can define a mapping function $f_k$ for each neighborhood to reflect different likelihood patterns for pixels at various distances from (i,j).

Figure 4:
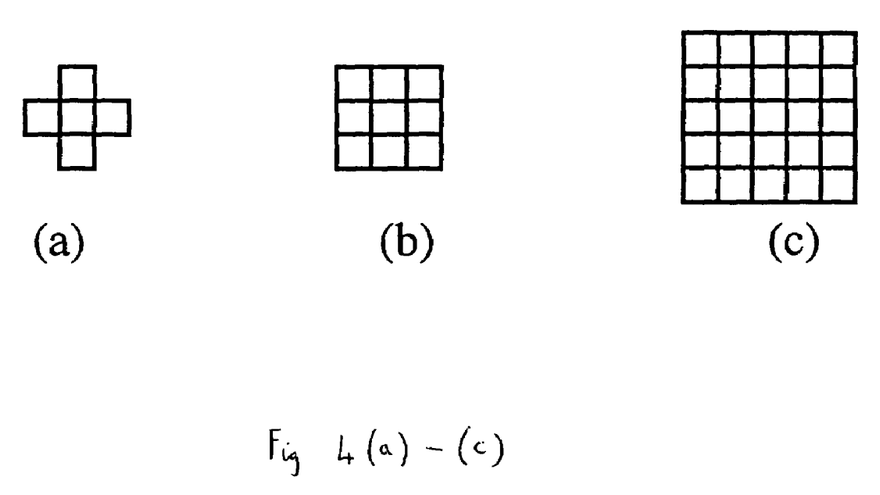

In this example, we studied three type of neighborhood: the cross, 3×3 and 5×5 shown in FIG. 4. The 5×5 actually can have 2 maps with one for the inner 3×3 and the other for the rest of the pixels. The polynomial maps, the exponential map, exponential map with shift, and the piecewise linear map were simulated.

A 256×256 Lena image (see FIG. 2(a), which shows a 512×512 version) is used a the test image. The halftone image is obtained by error diffusion using the Floyd-Steinberg kernal. The PSNR of the proposed algorithm using various mapping and neighborhood are shown in Table 5, 6 and 7. It can be observed that the piecewise linear $f_{pl,k,70}$ coupled with the 3×3 neighborhood gives a PSNR of 27.54 dB, which is only 0.5 dB lower than the computationally more expensive POCS with $F_3$. The image was viewed after 2 iterations and 4 iterations, and it was observed that the visual quality of $f_{pl,k,70}$ coupled with the 3×3 is very similar to that of POCS with $F_3$.

TABLE 5

PSNR of the proposed algorithm using various mappings for a 5 × 5 neighborhood

| 5 × 5 | k = 1 | k = 2 | k = 3 | k = 4 | k = 5 |
|---|---|---|---|---|---|
| $f_{lin,k}$ | 24.27 | 24.42 | 24.76 | 24.95 | 25.06 |
| $f_{exp,k}$ | 24.46 | 24.92 | 25.23 | 25.09 | 25.04 |
| $f_{exp,k,0.1}$ | 24.46 | 24.88 | 25.29 | 25.45 | 25.42 |
| $f_{exp,k,0.3}$ | 24.40 | 24.73 | 24.10 | 25.36 | 25.56 |
| $f_{exp,k,0.5}$ | 23.23 | 23.34 | 23.49 | 23.59 | 23.79 |
| $f_{exp,k,0.7}$ | 23.45 | 23.48 | 23.64 | 23.80 | 23.96 |
| $f_{exp,k,0.9}$ | 24.00 | 24.00 | 24.00 | 24.02 | 24.07 |

| | k = 0 | k = 10 | k = 20 | k = 30 | k = 40 |
|---|---|---|---|---|---|
| $f_{pl,k,150}$ | | 24.41 | 24.32 | 24.24 | 24.17 |
| $f_{pl,k,120}$ | | 24.37 | 24.27 | 24.18 | 24.11 |
| $f_{pl,k,100}$ | 24.01 | 23.81 | 23.75 | 23.69 | 23.66 |
| $f_{pl,k,80}$ | 23.47 | 23.63 | 23.57 | 23.52 | 23.50 |
| $f_{pl,k,70}$ | 23.05 | 23.27 | 23.24 | 23.22 | 23.23 |
| $f_{pl,k,60}$ | 22.44 | 23.04 | 23.04 | 23.05 | 23.07 |
| $f_{pl,k,50}$ | 22.04 | 22.88 | 22.91 | 22.94 | 23.02 |
| $f_{pl,k,40}$ | 21.44 | 22.48 | 22.49 | 22.55 | |
| $f_{pl,k,30}$ | 20.58 | 22.36 | 22.34 | | |
| $f_{pl,k,20}$ | 19.56 | 22.26 | | | |

TABLE 6

PSNR of the proposed algorithm using various mappings for a 3 × 3 neighborhood.

| 3 × 3 | k = 1 | k = 2 | k = 3 | k = 4 | k = 5 |
|---|---|---|---|---|---|
| $f_{lin,k}$ | 25.61 | 25.20 | 24.58 | 23.72 | 22.93 |
| $f_{exp,k}$ | 25.91 | 25.75 | 25.42 | 25.28 | 24.96 |
| $f_{exp,k,0.1}$ | 25.96 | 25.87 | 25.70 | 25.53 | 25.34 |
| $f_{exp,k,0.3}$ | 25.98 | 25.97 | 25.92 | 25.88 | 25.85 |
| $f_{exp,k,0.5}$ | 25.99 | 25.96 | 25.98 | 25.99 | 25.98 |
| $f_{exp,k,0.7}$ | 26.00 | 26.00 | 25.97 | 25.98 | 26.01 |
| $f_{exp,k,0.9}$ | 26.00 | 26.00 | 26.00 | 26.00 | 26.00 |

TABLE 6-continued

PSNR of the proposed algorithm using various mappings for a 3 × 3 neighborhood.

| | k = 0 | k = 10 | k = 20 | k = 30 | k = 40 |
|---|---|---|---|---|---|
| $f_{pl,k,150}$ | 26.97 | 26.90 | 26.77 | 26.60 | 26.45 |
| $f_{pl,k,120}$ | 27.20 | 27.14 | 27.00 | 26.80 | 26.61 |
| $f_{pl,k,100}$ | 27.39 | 27.34 | 27.21 | 26.99 | 26.78 |
| $f_{pl,k,80}$ | 27.52 | 27.53 | 27.45 | 27.23 | 27.02 |
| $f_{pl,k,70}$ | 27.45 | 27.54 | 27.52 | 27.33 | 27.14 |
| $f_{pl,k,60}$ | 27.29 | 27.38 | 27.48 | 27.37 | 27.26 |
| $f_{pl,k,50}$ | 26.98 | 27.16 | 27.27 | 27.23 | 27.32 |
| $f_{pl,k,40}$ | 25.73 | 25.90 | 26.08 | 26.09 | |
| $f_{pl,k,30}$ | 24.58 | 24.94 | 25.14 | | |
| $f_{pl,k,20}$ | 20.61 | 21.26 | | | |

TABLE 7

PSNR of the proposed algorithm using various mappings for a "cross" neighborhood.

| cross | k = 1 | k = 2 | k = 3 | k = 4 | k = 5 |
|---|---|---|---|---|---|
| $f_{lin,k}$ | 25.83 | 25.69 | 25.44 | 25.04 | 24.51 |
| $f_{exp,k}$ | 25.80 | 25.84 | 25.80 | 25.68 | 25.43 |
| $f_{exp,k,0.1}$ | 25.78 | 25.82 | 25.82 | 25.77 | 25.65 |
| $f_{exp,k,0.3}$ | 25.70 | 25.77 | 25.80 | 25.79 | 25.75 |
| $f_{exp,k,0.5}$ | 25.55 | 25.63 | 25.73 | 25.76 | 25.73 |
| $f_{exp,k,0.7}$ | 25.53 | 25.53 | 25.58 | 25.64 | 25.69 |
| $f_{exp,k,0.9}$ | 25.53 | 25.53 | 25.53 | 25.53 | 25.54 |

| | k = 0 | k = 10 | k = 20 | k = 30 | k = 40 |
|---|---|---|---|---|---|
| $f_{pl,k,150}$ | 26.43 | 26.25 | 26.07 | 25.91 | 25.78 |
| $f_{pl,k,120}$ | 26.69 | 26.47 | 26.25 | 26.04 | 25.88 |
| $f_{pl,k,100}$ | 26.95 | 26.70 | 26.43 | 26.19 | 26.00 |
| $f_{pl,k,80}$ | 27.28 | 27.01 | 26.71 | 26.43 | 26.20 |
| $f_{pl,k,70}$ | 27.40 | 27.18 | 26.89 | 26.55 | 26.32 |
| $f_{pl,k,60}$ | 27.46 | 27.34 | 27.08 | 26.72 | 26.41 |
| $f_{pl,k,50}$ | 27.16 | 27.21 | 27.13 | 26.91 | 26.73 |
| $f_{pl,k,40}$ | 25.86 | 26.01 | 25.96 | 25.69 | |
| $f_{pl,k,30}$ | 23.79 | 24.22 | 24.42 | | |
| $f_{pl,k,20}$ | 19.42 | 20.05 | | | |

4. Hybrid Algorithm

Figure 6A:
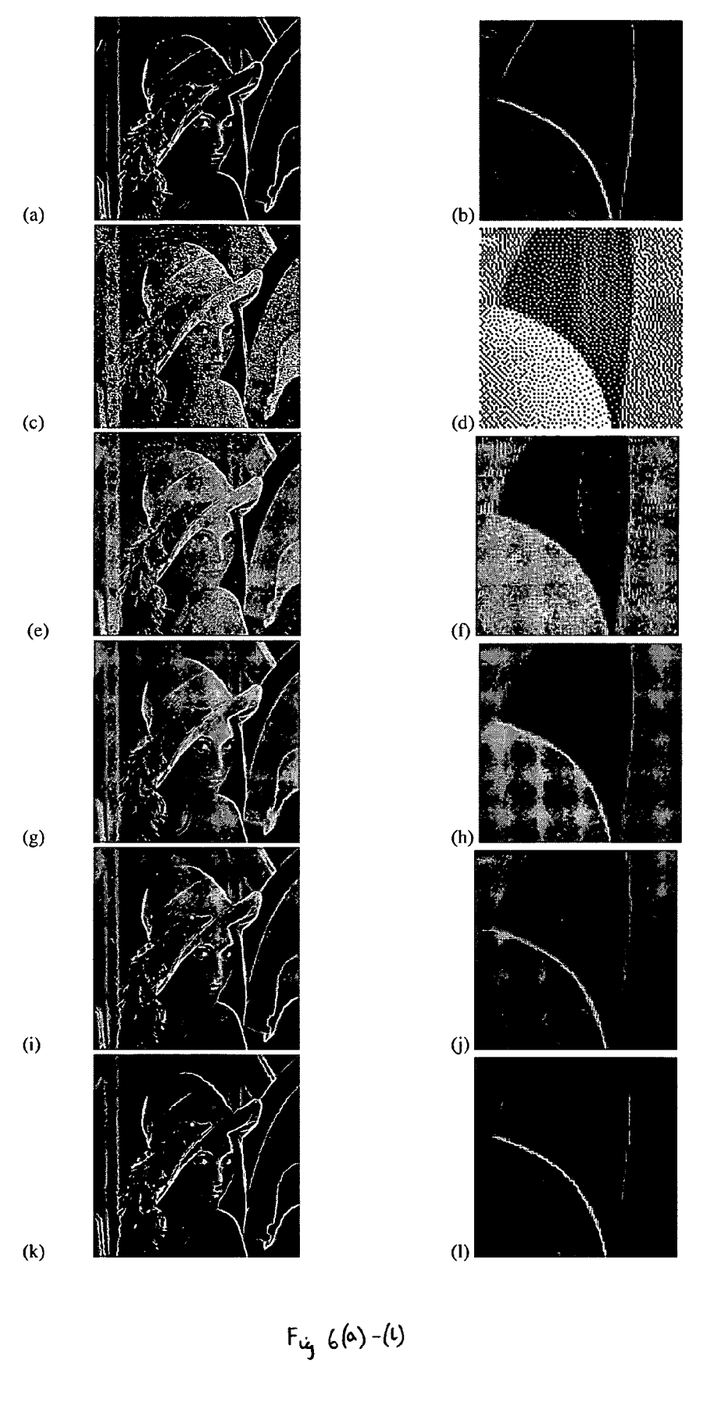

As mentioned above, a simple lowpass filtering tends to be a poor way to do inverse halftoning because it tends to give low quality blurred images, as shown in FIGS. 6(a)-(f). FIG. 6(a) shows a 512×512 Lena image, while 6(b) shows part of the same image at a greater resolution. FIGS. 6(c) and (d) are the halftone image obtained by error diffusion using the Floyd-Steinberg kernal. FIGS. 6(e) and (f) are obtained by applying simple low pass filter [1.5 2 1.5;2 3 2;1.5 2 1.5]/17 (in Matlab notation), a peak-signal-to-noise ratio (PSNR) of 25.7392 dB. The PSNR is defined as $10\log_{10}(255/MSE)$ where MSE is the mean square error.

Although such low pass image is poor in visual quality, it can reveal very important information of the original image to us. As seen in FIG. 6(e), this lowpass image can reveal the objects fairly well though the edges are blurred and the flat areas are noisy. To improve the simple low pass filtering, the flat regions should be filtered harder to remove the noisy pattern, while the edge region should use some kind of edge preserving filtering to maintain the sharp edges.

When the technique according to the invention described in section 1 is applied to halftoned images, high quality reconstructed images are obtained with sharp edges and low noise in smooth areas. When the reconstructed image is compared with the original, it is observed that most of the errors are located at the smooth regions though some are at the edges.

By contrast, images reconstructed using simple lowpass filtering tend to have large errors at edges but small errors at smooth regions. The error of the image reconstructed from a lowpass filter and the error of the image reconstructed from the proposed filter (described here in section 1) tend to be orthogonal and independent of each other. Thus, the present inventors have observed that it is possible to improve the overall quality by taking weighted averages of the two reconstructed images, provided that a good low pass filter is used to produce the other of the two reconstructed images. One such good filter is a triangular form.

The simplest way to combine the reconstructed images is to average them. Alternatively a weighted average of the adaptive filter and the triangular lowpass filter can be used, with a weighting selected to give an optimal combination.

Figure 5:
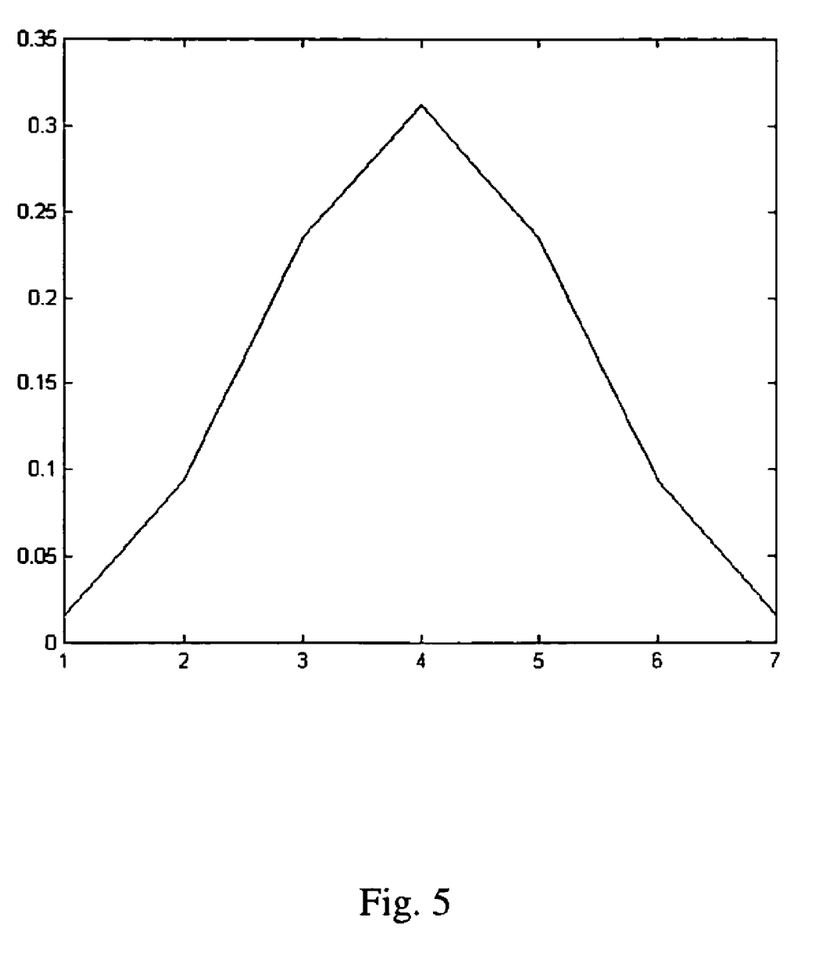
FIG. 5 shows a triangle low pass filter with size 7.

The PSNR of the FEPF method using polynomial filter with k=6 and 6 iterations (shown in FIGS. 6(g) and (h)) is about 31.00 dB. The edges are very sharp. A triangular filter shown in FIG. 5, gave an image (shown in FIGS. 6(i) and (j)) having a PSNR of 30.59 dB, which is much lower. However, an average of the image reconstructed from the proposed spatial varying filter of section 1 and the image from the triangular filter (shown in FIGS. 6(k) and (l)) achieved a PSNR of 31.30 dB.

Although the invention has been described above in relation to specific embodiments many modifications are possible within the scope of the invention as will be clear to a skilled person.

The invention claimed is:

1. A method for converting a halftone image having a halftone value for each of a plurality of pixels, into a reconstructed image which for each of said pixels takes on one of more than two possible values, comprising the following steps:

representing a halftone image as a plurality of individual pixel values, where each pixel value represents a physical attribute of the image at a corresponding location in the image;

for successive individual pixels:

defining a set of neighborhood pixels of the individual pixel, the set of neighborhood pixels including the individual pixel and additionally a plurality of pixels proximate said individual pixel;

deriving for each pixel of the neighborhood, a significance coefficient that is based upon the value of that pixel, by deriving a baseline value for the individual pixel that is obtained by low pass filtering of the halftone image, and deriving said significance coefficient as a decreasing function f(v) of the absolute difference (v) between the halftone value at the neighborhood pixel and the baseline value for the individual pixel; and deriving the reconstructed value of the individual pixel as a sum over the pixels of the neighborhood of a product of the halftone image value at that neighborhood pixel with the significance coefficient of that neighborhood pixel; and reproducing the image from the reconstructed values of the individual pixels.

2. A method according to claim 1 in which said halftone image is derived from an original image having a continuous value for each pixel, and, for each individual pixel, said significance coefficient of each neighborhood pixel is an indication of the likelihood that the value of that neighborhood pixel in the original image is correlated with the value of the individual pixel in the original image.

3. A method according to claim 1 in which f(v) is a non-linear function.

4. A method according to claim 1 in which f(v) is a continuous function.

5. A method according to claim 4 in which f(v) is a function of the form $f(v)=a(1-v/b)^k$ where a and b are predefined numbers and k is a predefined integer.

6. A method according to claim 1 comprising a further step of forming an enhanced reconstructed image as a linear combination of said reconstructed image and a continuous image derived from said halftone image by a second image reconstruction method.

7. A method according to claim 6 in which said second image reconstruction method is a low pass filter.

8. A computer-readable medium storing a computer-executable program causing a computing device to perform the method according to claim 1.

* * * * *